United States Patent
Lingafelt et al.

(10) Patent No.: US 7,278,162 B2
(45) Date of Patent: Oct. 2, 2007

(54) USE OF A PROGRAMMABLE NETWORK PROCESSOR TO OBSERVE A FLOW OF PACKETS

(75) Inventors: Charles Steven Lingafelt, Durham, NC (US); Norman C. Strole, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 761 days.

(21) Appl. No.: 10/405,671

(22) Filed: Apr. 1, 2003

(65) Prior Publication Data

US 2004/0199790 A1 Oct. 7, 2004

(51) Int. Cl.
*H04L 29/00* (2006.01)
(52) U.S. Cl. .......................... 726/23; 726/13
(58) Field of Classification Search ............... 726/13, 726/11, 23
See application file for complete search history.

(56) References Cited

U.S. PATENT DOCUMENTS

| | | | |
|---|---|---|---|
| 5,414,833 A | 5/1995 | Hershey et al. | |
| 5,621,889 A | 4/1997 | Lermuzeaux et al. | |
| 5,796,942 A | 8/1998 | Esbensen | |
| 5,991,881 A | 11/1999 | Conklin et al. | |
| 6,108,782 A | 8/2000 | Fletcher et al. | |
| 6,119,236 A | 9/2000 | Shipley | |
| 6,219,706 B1 | 4/2001 | Fan et al. | |
| 6,219,786 B1 | 4/2001 | Cunningham et al. | |
| 6,404,752 B1 | 6/2002 | Allen, Jr. et al. | |
| 6,460,120 B1 | 10/2002 | Bass et al. | |
| 2002/0038339 A1 * | 3/2002 | Xu | 709/203 |
| 2003/0229710 A1 * | 12/2003 | Lie et al. | 709/231 |
| 2004/0015719 A1 * | 1/2004 | Lee et al. | 713/201 |

OTHER PUBLICATIONS

Lee, Justin et al., "A Survey of Intrusion Detection Analysis Methods," CSE 1999, pp. 1-10.
Mukherjee, Biswanath et al., "Network Intrusion Detection," IEEE 1994, pp. 28-41.
Bauer, Dennis C. et al., "Detecting Anomalous Behavior: Optimization of Network Traffic Parameters Via an Evolution Strategy," IEEE 2001, pp. 34-39.
Bonifacio, Jose Maurico, Jr. et al., "Neural Networks Applied in Intrusion Detection Systems," IEEE 1998, vol. 1, pp. 205-210.

\* cited by examiner

*Primary Examiner*—Matthew B Smithers
(74) *Attorney, Agent, or Firm*—Sawyer Law Group LLP

(57) ABSTRACT

A method and system for detecting attempted intrusions into a network, including: providing a network processor for monitoring packets transmitted over a communications link of the network; receiving a plurality of packets from the communications link by the network processor; and pre-filtering the plurality of packets by the network processor to identify packets potentially with patterns of interest. These packets are forwarded to a NIDS. The NIDS then examines the forwarded packets to identify the packets that have the pattern of interest. By using the network processor to pre-filter the packets, the number of packets examined by the NIDS is significantly reduced. Also, the capacity of the NIDS can be increased without requiring changes in the NIDS.

20 Claims, 6 Drawing Sheets

US 7,278,162 B2

USE OF A PROGRAMMABLE NETWORK PROCESSOR TO OBSERVE A FLOW OF PACKETS

FIELD OF THE INVENTION

The present invention relates to security in a network, and more particularly to network intrusion detection systems in the network.

BACKGROUND OF THE INVENTION

FIG. 1 illustrates a conventional network with an intrusion detection system. The network comprises a communications link 104 over which packets are transmitted between an unsecured zone 102, either within the network or from outside the network, and a secure zone 108 within the network. The secure zone 108 may be protected by a firewall or some other protective device. Some networks also have a network intrusion detection system (NIDS) 110. The NIDS detects attempts by "hackers" and other malicious users to break into or disrupt the network. Generally, NIDS's are passive devices that examine every packet transmitted over the communication link 104 for patterns of interest, also known as intrusion detection signatures. Upon finding a packet with the pattern of interest, the NIDS 110 informs the system operators and appropriate action is taken.

However, the vast majority of packets are not from "hackers" or malicious uses. Thus, the NIDS 10 performs a task analogous to looking for "a needle in a haystack." A significant amount of the resources of the NIDS 110 is therefore consumed by examining packets without the pattern of interest, significantly limiting the resources available to find packets with the pattern of interest.

Accordingly, there exists a need for an improved method and system for detecting attempted intrusions into a network. The method and system should reduce the resources of an NIDS required to identify packets with the patterns of interest without compromising performance or substantially increase the performance of the system for the same given NID resource. The present invention addresses this need.

SUMMARY OF THE INVENTION

A method and system for detecting attempted intrusions into a network, including:
providing a network processor for monitoring packets transmitted over a communications link of the network; receiving a plurality of packets from the communications link by the network processor; and pre-filtering the plurality of packets by the network processor to identify packets potentially with patterns of interest. These packets are forwarded to a NIDS. The NIDS then examines the forwarded packets to identify the forwarded packets that have the pattern of interest. By using the network processor to pre-filter the packets, the number of packets examined by the NIDS is significantly reduced. Also, the capacity of the NIDS call be increased without requiring changes in the NIDS.

DETAILED DESCRIPTION

The present invention provides an improved method and system for detecting attempted intrusions into a network. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The method and system in accordance with the present invention utilizes a network processor to pre-filter packets transmitted over a communications link to identify packets potentially with a pattern of interest. These packets are forwarded to a network intrusion detection system (NIDS). The NIDS then examines the forwarded packets to identify the packets that have the patterns of interest. The network administrator (not shown) is notified of the forwarded packets that have the patterns of interest. Alternatively, other alert processes could be used. By using the network processor to pre-filter the packets, the number of packets examined by the NIDS is significantly reduced.

To more particularly describe the features of the present invention, please refer to FIGS. 2 through 6 in conjunction with the discussion below.

Figure 1:
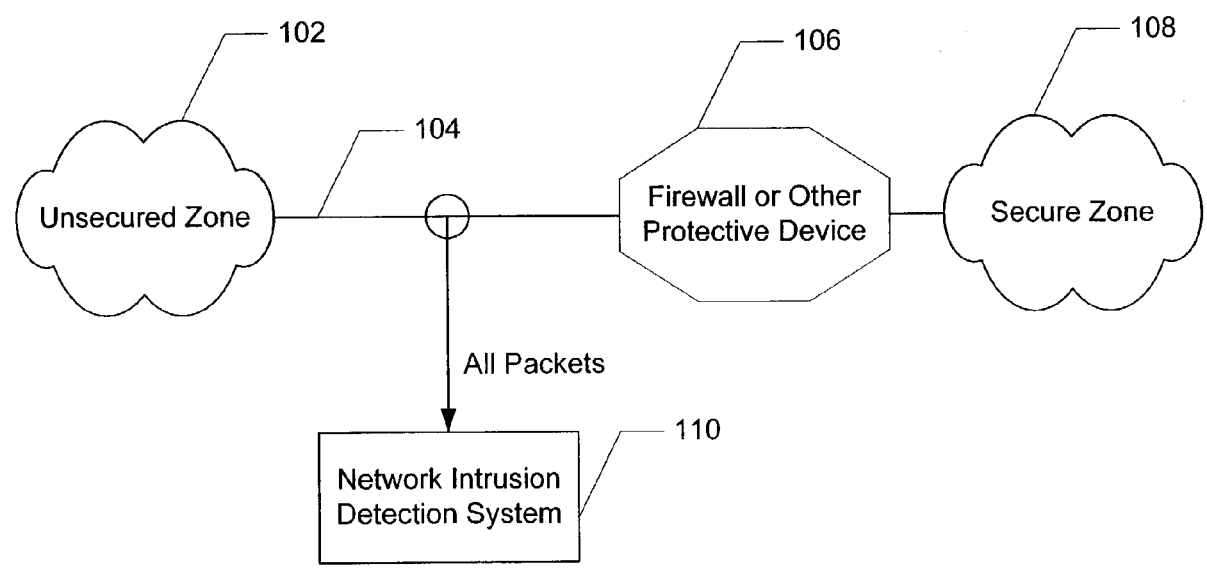
FIG. 1 illustrates a conventional network with an intrusion detection system.
Figure 2:
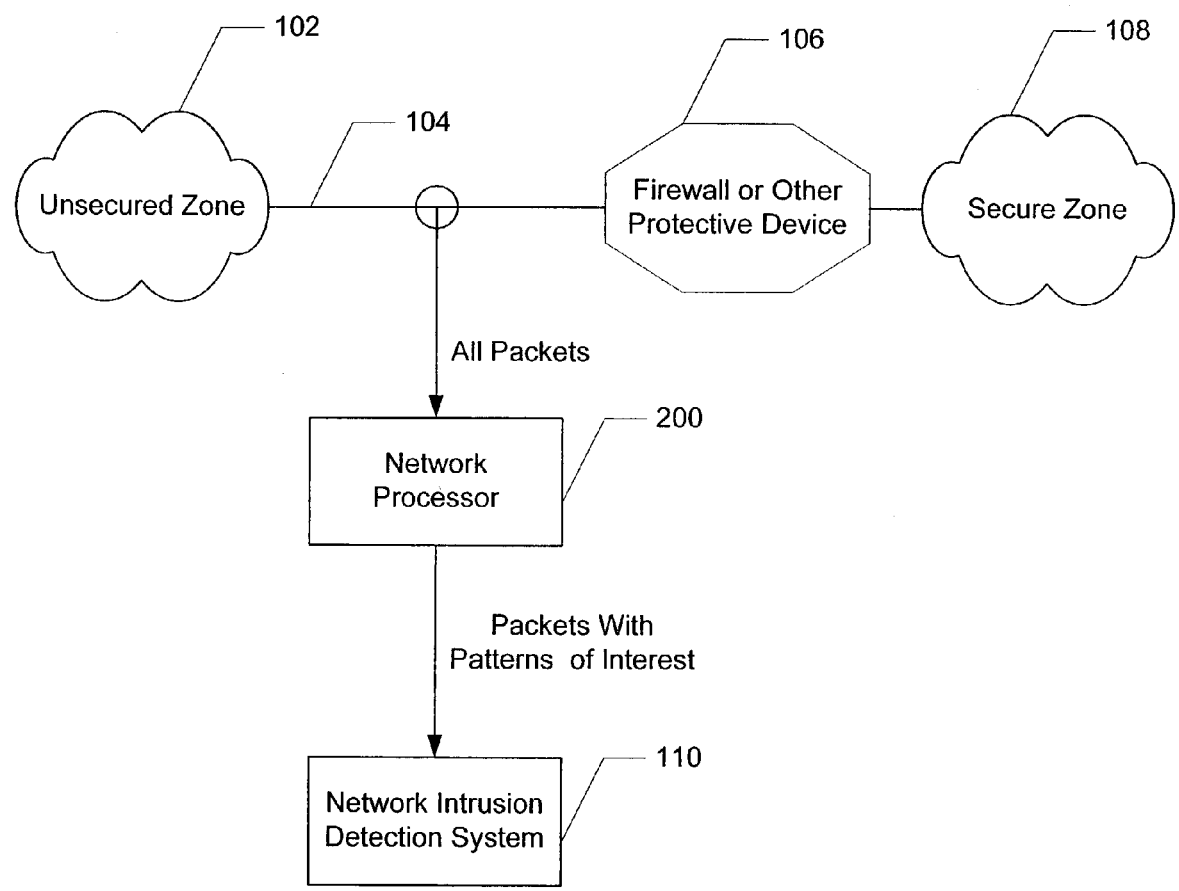
FIG. 2 illustrates a preferred embodiment of an intrusion detection system in accordance with the present invention.

FIG. 2 illustrates a preferred embodiment of an intrusion detection system in accordance with the present invention. The system is the same as the prior art system (FIG. 1) except a network processor 200 is coupled between the communications link 104 and the NIDS 110. The network processor 200 performs a coarse or pre-filtering of the packets transmitted over the communications link 104, while the NIDS performs a fine filtering of the packets forwarded to it by the network processor 200. The network processor 200 is not resident upon a host system, and thus is not a host based intrusion detection system, i.e., the network processor 200 does not monitor a computer from inside the computer. Also, the network processor 200 is not required to be associated with a firewall or other similar access control device but could be.

Figure 3:
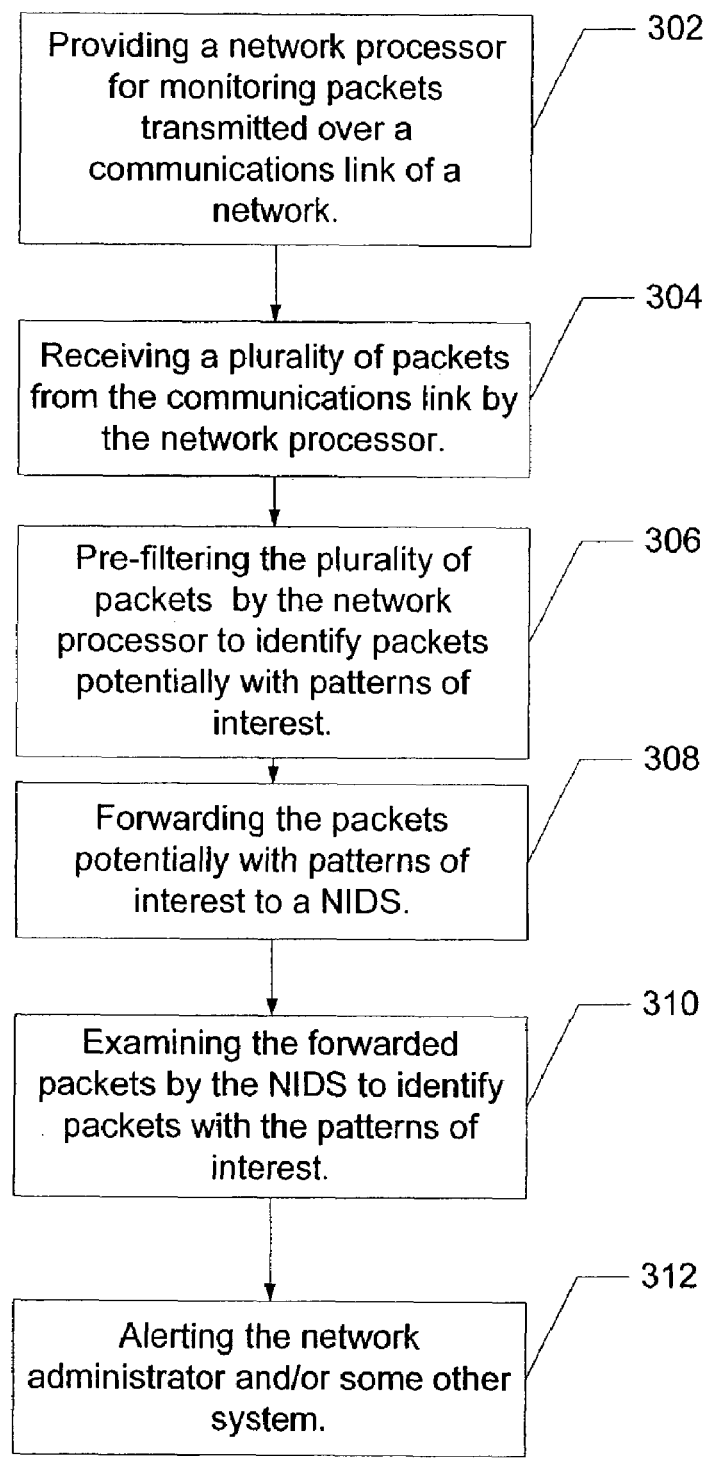
FIG. 3 is a flowchart illustrating a preferred embodiment of a method for intrusion detection in accordance with the present invention.

FIG. 3 is a flowchart illustrating a preferred embodiment of a method for intrusion detection in accordance with the present invention. Referring to both FIGS. 2 and 3, first, the network processor 200 is provided for monitoring packets transmitted over a communications link 104 of a network, via step 302. Next, a plurality of packets transmitted over the communications link 104 is received by the network processor 200, via step 304. The network processor 200 pre-filters the plurality of packets to identify packets potentially with the patterns of interest, via step 306. These packets with the patterns of interest are forwarded to the NIDS 110, via step 308. The NIDS 110 then examines the forwarded packets to identify the packets with the patterns of interest, via step 310. The network administrator and/or some other system is alerted of these packets, via step 312.

The network processor 200 can use any number of techniques or a combination of techniques to examine the plurality of packets transmitted over the communication link 104, including but not limited to: scanning the plurality of packets via a programmable protocol processor (not shown) to look for the patterns of interest; utilizing application specific hardware assist functions to scan for the patterns of interest; storing the patterns of interest within a content addressable memory for rapid comparison against the plurality of packets (or packet segments); and utilizing a tree search or similar capability within the network processor 200 to search for the patterns of interest.

In the preferred embodiment, the patterns of interest are loaded into the network processor 200, and these patterns are compared with each packet. Packets that potentially match a pattern are forwarded to the NIDS 110. One of ordinary skill in the art will understand that other examination techniques may be used without departing from the spirit and scope of the present invention.

The network processor 200 can be coupled to the communications link 104 in any number of ways, including but not limited to: a passive tap on the communications link 104; a switch with a port mirroring the functionality of the network processor 200; and a monitoring link that "runs through" the network processor 200, where all packets are forwarded though the network processor 200 and copies of packets potentially with the patterns of interest are forwarded to the NIDS 110. One of ordinary skill in the art will understand that other coupling techniques may be used without departing from the spirit and scope of the present invention.

In the preferred embodiment, the network processor 200 does not maintain state information to determine if a packet should be forwarded to the NIDS 110. For detection of intrusions that require multiple packets and packet flow state information, the network processor 200 would forward all identified packets to the NIDS 110, and the NIDS 100 would maintain the packet state information. In an alternative embodiment, the network processor 200 could maintain the state information.

Figure 4:
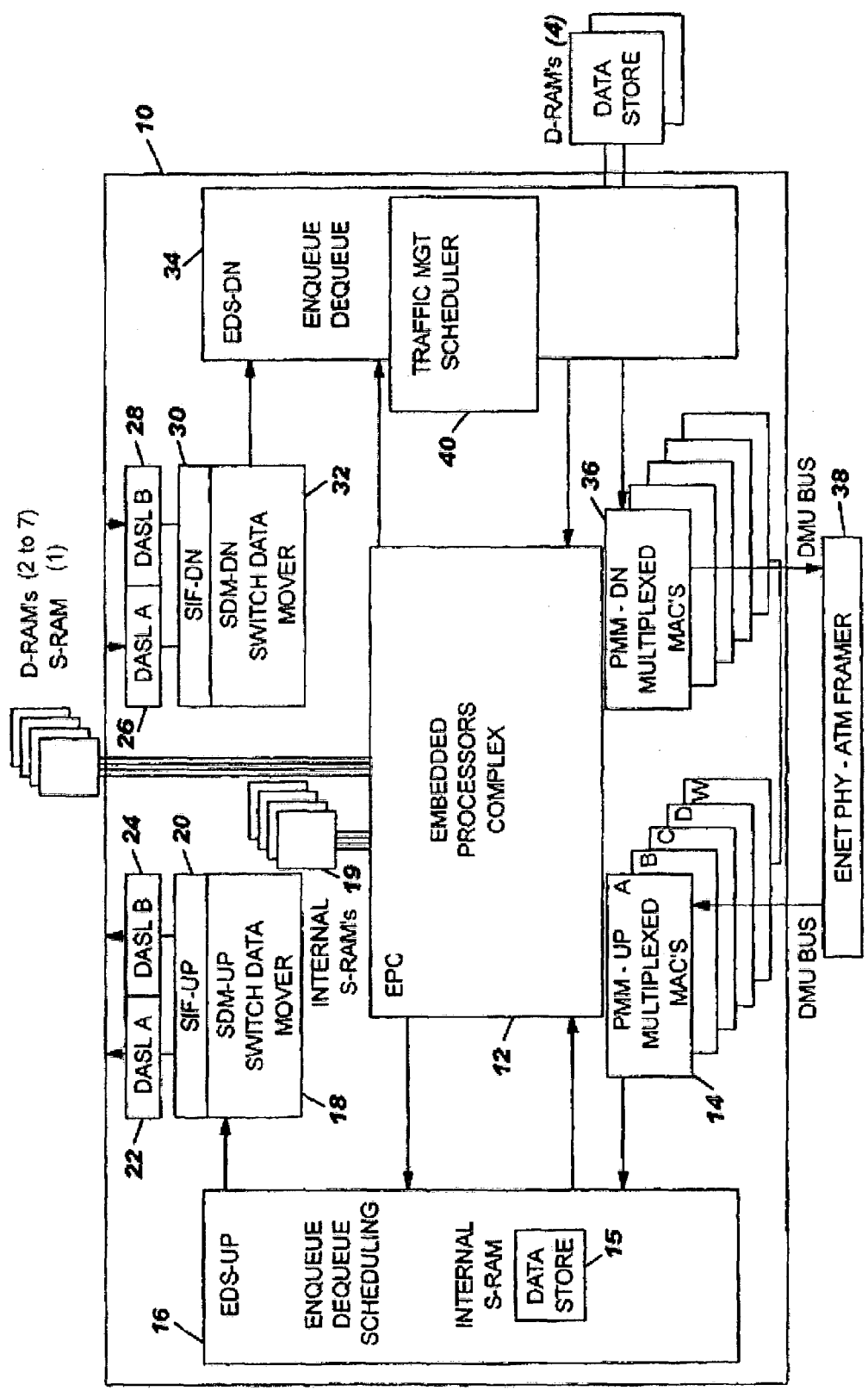
FIG. 4 illustrates in more detail the network processor utilized in the method and system in accordance with the present invention.

FIG. 4 illustrates in more detail the network processor utilized in the method and system in accordance with the present invention. The network processor 200 comprises a substrate 10 and a plurality of sub-assemblies integrated on the substrate 10. The sub-assemblies are arranged in an Upside configuration and a Downside configuration. As used herein, "Upside' refers' to data flows inbound from a network to the network processor 200, while "Downside" refers to data outbound from the network processor 200 to a network. The data flow follows the respective configurations. As a consequence, there is an Upside data flow and a Downside data flow. The sub-assemblies in the Upside include Enqueue-Dequeue-Scheduling UP (EbS-UP) logic 16, multiplexed MAC's-UP (PPM-UP) 14, Switch Data Mover-UP (SDM-UP) 18, System Interlace (SIF) 20, Data Align Serial Link A (DASLA) 22, and Data Align Serial Link B (DASLB) 24.

The sub-assemblies in the downside include DASL-A 26, DASL-B 28, SIF 30, SDM-DN 32, EDS-DN 34, and PPM-DN 36. The network processor 200 also includes a plurality of internal S-RAMS 15 and 19, Traffic Mgt Scheduler 40, and Embedded Processor Complex (EPC) 12. An interface device 38 is coupled by respective DMU Busses to PMM 14 and 366. The interface 38 could be any suitable L1 circuitry, such as Ethernet Physical (ENET PHY), ATM Framer, etc. The type of interface is dictated in part by the network media to which the network processor 200 is connected. A plurality of external D-RAM's and S-RAM are available for use by the network processor 200. The group of S-RAMs 19 form an internal data memory. The EPC 12 provides and controls the programmability of the network processor 200.

Figure 5:
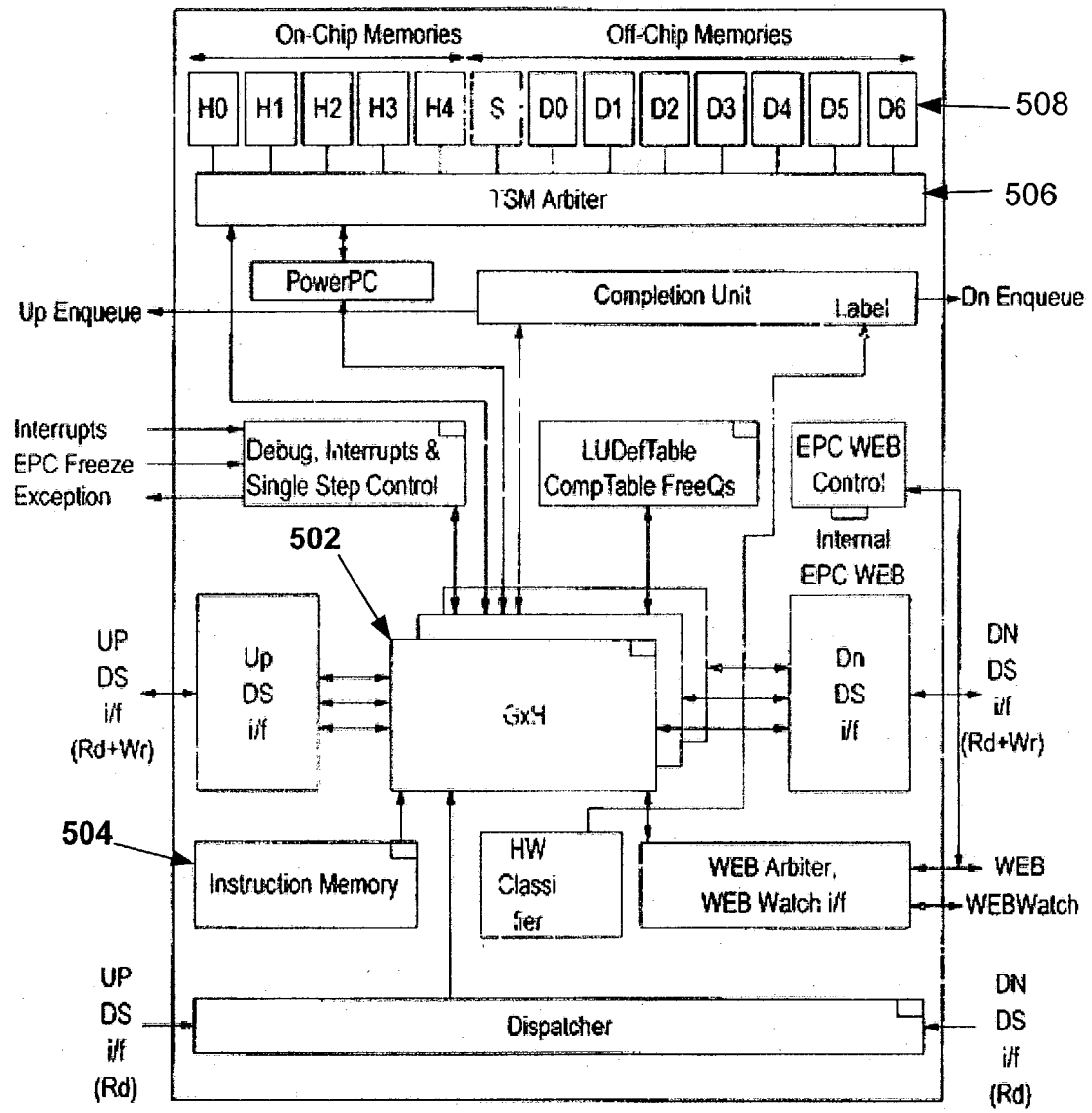
FIG. 5 illustrates in more detail the Embedded Processing Complex (EPC) of the network processor in accordance with the present invention.

FIG. 5 illustrates in more detail the Embedded Processing Complex (EPC) of the network processor in accordance with the present invention. The EPC 12 comprises the following components:

N processing units, called GxH 502: The GxH 502 concurrently execute picocode for implementing the present invention that is stored in a common Instruction Memory 504. Each GxH contains several coprocessors, including the Tree Search Engine Coprocessor (TSE) (not shown). The TSE performs searches in the trees, and also interfaces to a Tree Search Memory (TSM) arbiter 506.

Instruction Memory 504: The Instruction Memory 504 is loaded during initialization and contains the picocode for implementing the present invention.

Tree Search Memory (TSM) Arbiter 506: There are a number of shared internal and external memory locations available to each GxH 502. Since this memory is shared an arbiter is used to control access to the memory. The TSM 506 can be accessed directly by the picocode. Also, the TSM 506 will be accessed by the TSE during tree searches.

On-Chip and Off-Chip Memories (508): The memory complex of the network processor 200 includes a plurality of on-chip and off-chip memories 508. The TSM 506 provides the communication link between the GxH 502 and the memories 508. The patterns of interest are stored within these memories 508.

The architecture of the network processor 200 is further described in U.S. Pat. Nos. 6,404,752 and 6,460,120, assigned to the assignee of the present invention. Applicant hereby incorporates these patents by reference.

Although the preferred embodiment is described above with the network processor illustrated in FIGS. 4 and 5, one of ordinary skill in the art will understand that other network processors may be used without departing from the spirit and scope of the present invention.

In the preferred embodiment packets transmitted over the communications link 104 are received by the GxH 502. The GxH 502 runs the picocode stored in the Instruction Memory 504 and sends the frame of the packet to the TSE within the GxH 502. The TSE compares the frame with the patterns of interest stored in the memories 508. The GxH 502 then forwards or not forwards the packet to the NIDS 110 based on the result of the comparison. For example, the comparison could be to determine if the frame matches or closely matches any of the stored patterns or ally combinations of the stored patterns. If it is determined to be so, the GxH 502 forwards the packet to the NIDS 110. If not, then the GxH 502 drops the packet.

Figure 6:
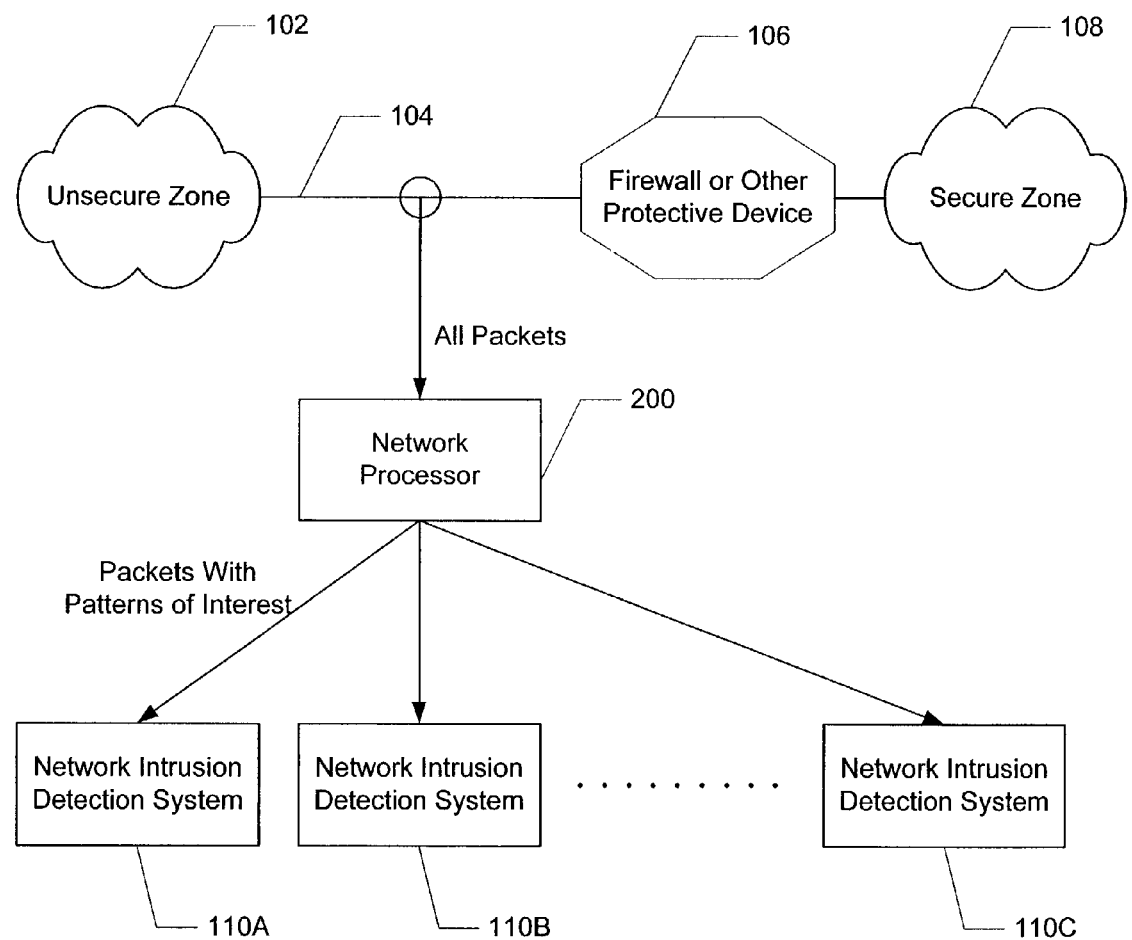
FIG. 6 illustrates the alternative embodiment of an intrusion detection system in accordance with the present invention.

In an alternative embodiment, the present invention functions as a load balancer, balancing the load across multiple NIDS's. FIG. 6 illustrates the alternative embodiment of an intrusion detection system in accordance with the present invention. In this system, once the network processor 200 identifies packets potentially with the patterns of interest, each packet is forwarded to one of a plurality of NIDS's 110A-110N. Any number of criteria or combination of criteria may be used to balance between the NIDS's 110A-110N, including but not limited to: source address; destination address; protocol type; port number; and current loading of the NIDS's 110A-110N. For example, packets with a first set of source addresses are forwarded to the first NIDS 110A, packets with a second set of source addresses are forwarded to the second NIDS 110B, etc. One of ordinary skill in the art will under-stand that other criteria may be used without departing from the spirit and scope of the present invention.

An improved method and system for detecting attempted intrusions into a network has been disclosed. A network processor is used to pre-filter packets transmitted over a communications link to identify packets with a pattern of interest. These packets are forwarded to a NIDS. The NIDS then filters the forwarded packets to identify the forwarded packets that hive the pattern of interest. By using the network processor to pre-filter the packets, the number of packets examined by the NIDS is significantly reduced. Also, the capacity of the NIDS can be increased without requiring changes in the NIDS.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for detecting attempted intrusions into a network, the method comprising:
    monitoring a plurality of packets transmitted over a communications link of the network using a network processor;
    coarsely examining each of the plurality of packets to identify one or more packets that match or closely match one or more intrusion detection signatures using the network processor; and
    forwarding each of the one or more identified packets from the network processor to a Network Intrusion Detection System (NIDS),
    the NIDS conducting a finer examination of each of the one or more identified packets to determine whether the identified packet is an attempted intrusion into the network.

2. The method of claim 1, wherein forwarding each of the one or more identified packets comprises:
    forwarding each of the one or more identified packets from the network processor to one of a plurality of Network Intrusion Detection Systems based upon a predetermined criteria.

3. The method of claim 1, wherein the predetermined criteria comprises one or more of a group consisting of:
    a source address;
    a destination address;
    protocol type;
    port number; and
    current load of the NIDS.

4. The method of claim 1, wherein forwarding each of the one or more identified packets comprises:
    forwarding only the one or more identified packets that match or closely match the one or more intrusion detection signatures from the network processor to the NIDS to reduce a number of packets examined by the NIDS.

5. The method of claim 1, wherein monitoring of the plurality of packets using the network processor does not occur from inside a computer system that is being monitored.

6. The method of claim 1, wherein coarsely examining each of the plurality of packets using the network processor comprises:
    coarsely examining each of the plurality of packets to identify one or more packets that match or closely match one or more intrusion detection signatures using a plurality of embedded processors in the network processor.

7. The method of claim 1, further comprising:
    maintaining packet state information in the network processor.

8. A system for detecting attempted intrusions into a network, the system comprising:
    a network processor, the network processor comprising
        means for monitoring a plurality of packets transmitted over a communications link of the network,
        means for coarsely examining each of the plurality of packets to identify one or more packets that match or closely match one or more intrusion detection signatures, and
    means for forwarding each of the one or more identified packets to a Network Intrusion Detection System (NIDS),
    the NIDS conducting a finer examination of each of the one or more identified packets to determine whether the identified packet is an attempted intrusion into the network.

9. The system of claim 8, wherein the means for forwarding each of the one or more identified packets comprises:
    means for forwarding each of the one or more identified packets to one of a plurality of Network Intrusion Detection Systems based upon a predetermined criteria.

10. The system of claim 9, wherein the predetermined criteria comprises one or more of a group consisting of:
    a source address;
    a destination address;
    protocol type;
    port number; and
    current load of the NIDS.

11. The system of claim 8, wherein the means for coarsely examining each of the plurality of packets comprises a plurality of embedded processors.

12. The system of claim 8, wherein the network processor further comprises means for maintaining packet state information.

13. The system of claim 8, wherein the means for forwarding each of the one or more identified packets comprises:
    means for forwarding only the one or more identified packets that match or closely match the one or more intrusion detection signatures to the NIDS to reduce a number of packets examined by the NIDS.

14. The system of claim 8, wherein the network processor does not reside in a computer system that is being monitored by the network processor.

15. A computer readable storage medium with encoded a computer program for detecting attempted intrusions into a network, the computer program comprising instructions for:
    monitoring a plurality of packets transmitted over a communications link of the network using a network processor;
    coarsely examining each of the plurality of packets to identify one or more packets that match or closely match one or more intrusion detection signatures using the network processor; and forwarding each of the one or more identified packets from the network processor to a Network Intrusion Detection System (NIDS), the NIDS conducting a finer examination of each of the one or more identified packets to determine whether the identified packet is an attempted intrusion into the network.

16. The medium of claim 15, wherein forwarding each of the one or more identified packets comprises:

forwarding each of the one or more identified packets from the network processor to one of a plurality of Network Intrusion Detection Systems based upon a predetermined criteria.

17. The medium of claim 16, wherein the predetermined criteria comprises one or more of a group consisting of:

a source address;
a destination address;
protocol type;
port number; and
current load of the NIDS.

18. The medium of claim 15, wherein forwarding each of the one or more identified packets comprises:

forwarding only the one or more identified packets that match or closely match the one or more intrusion detection signatures from the network processor to the NIDS to reduce a number of packets examined by the NIDS.

19. The medium of claim 15, wherein monitoring of the plurality of packets using the network processor does not occur from inside a computer system that is being monitored.

20. The medium of claim 15, wherein the computer program further comprises instructions for:

maintaining packet state information in the network processor.

* * * * *